United States Patent [19]

Wills

[11] Patent Number: 5,038,398

[45] Date of Patent: Aug. 6, 1991

[54] METHOD OF ASSIGNING COMMUNICATION LINKS IN A DYNAMIC COMMUNICATION NETWORK

[75] Inventor: M. Scott Wills, Melbourne, Fla.

[73] Assignee: Harris Corporation, Melbourne, Fla.

[21] Appl. No.: 391,200

[22] Filed: Aug. 9, 1989

[51] Int. Cl.⁵ .................................................. H04B 7/185
[52] U.S. Cl. ...................................... 455/13; 455/17; 455/63; 455/67; 342/358
[58] Field of Search ........................................ 455/3-5, 455/8-9, 12-13, 16-17, 166, 179, 186, 33, 63, 67; 342/352, 356, 358

[56] References Cited

U.S. PATENT DOCUMENTS

| | | | |
|---|---|---|---|
| Re. 28,577 | 10/1975 | Schmidt | 455/13 |
| 4,578,815 | 3/1986 | Persinotti | 455/17 |
| 4,817,190 | 3/1989 | Comroe et al. | 455/17 |

Primary Examiner—Reinhard J. Eisenzopf
Assistant Examiner—Andrew Faile
Attorney, Agent, or Firm—Antonelli, Terry, Stout & Kraus

[57] ABSTRACT

A method of assigning communicaton links in a dynamic communication network, such as a network of earth orbiting satellites arranged, for example in three constellations. The assignments are made in phases, with the first phases assigning high priority link classes. Subsequent phases assign lower priority link classes. A set of constraints is established, and a high priority subset of these constraints can be assured by requiring that any assignment set to be accepted results in a network topology satisfying that subset of constraints even if existing links must be intentionally broken. Other constraints are met only if existing links need not be broken. To assign the links, the set of candidate nodes having unassigned transceivers is determined, then a set of possible links that can be formed by the set of candidate nodes is determined, the possible links are evaluated to determine a set of link assignments satsifying the greatest number of the high priority constraints, and the assigned links are established.

33 Claims, 8 Drawing Sheets

▷ — BSTS
◇ — SSTS
○ — CV

```
TYPE PLATFORM_TYPE      IS (BSTS, CV, SSTS, GEP);
TYPE ADDRESS_TYPE       IS INTEGER;

MAXIMUM_LINKS           : CONSTANT := 7;
    -- MAXIMUM NUMBER OF TRANSCEIVERS PRESENT AT ANY NODE
SEC                     : CONSTANT := 1;
    -- TIME UNITS ARE IN SECONDS.

PACKAGE LINK_ASSIGNMENT IS

TYPE LINK_CLASS IS (EP_LINKS, CV_XLINKS, BSTS_XLINKS);
        -- THREE LINK CLASSES ARE PRESENT IN BCD.  ENTRY POINTS AMONG
        -- BSTS SSTS AND CV CONSTELLATIONS, CV CROSS LINKS, AND BSTS
        -- CROSS LINKS, RESPECTIVELY.

TYPE ASSIGNMENT_ARRAY IS ARRAY(1..MAXIMUM_LINKS) OF ADDRESS_TYPE;
        -- THE RESULT OF THE ASSIGN_LINKS PROCEDURE.

UNCLASSIFIABLE_LINK : EXCEPTION;
        -- RAISED BY CLASSIFY_LINK IF THE NODE PAIRING SPECIFIED DOES
        -- NOT FIT ANY ESTABLISHED ASSIGNMENT PHASE.

FUNCTION CLASSIFY_LINK(
        NODE1, NODE2 : PLATFORM_TYPE) RETURN LINK_CLASS;
    -- RETURN THE LINK_CLASS TO WHICH A LINK BETWEEN NODE1 AND NODE2 BELONGS.
    -- RAISE UNCLASSIFIABLE_LINK IF THIS TYPE OF LINK DOES NOT FIT ANY OF
    -- THESE CLASSES.

PROCEDURE SCHEDULE_LINK_ASSIGNMENT (
        MY_ADDRESS          : ADDRESS_TYPE;
        ASSIGNMENT_DELAY    : EVENT_TIME_TYPE := 1.0 * SEC);
    -- SCHEDULE A LINK ASSIGNMENT COMPUTATION ASSIGNMENT_DELAY SECONDS
    -- FROM NOW.  DEFAULT IS 1 SECOND, CORRESPONDING TO THE TOPOLOGY
    -- UPDATE FLOOD PROPAGATION TIME.

PROCEDURE ASSIGN_LINKS(
        MY_ADDRESS   : ADDRESS_TYPE;
        ASSIGNMENT   : IN OUT ASSIGNMENT_ARRAY);
    -- COMPUTE THE LINK ASSIGNMENT ALGORITHM AND RETURN ASSIGNMENTS
    -- FOR EACH LU AT MY_ADDRESS.

END LINK_ASSIGNMENT;
```

FIG. 3

```
PROCEDURE ASSIGN_LINKS (
      MY_ADDRESS:  ADDRESS_TYPE;
      ASSIGNMENT:  OUT ASSIGNMENT_ARRAY) IS

C       : CANDIDATE_NODE_SET_FOR_CURRENT_PHASE;
      L       : CANDIDATE_LINK_SET_FOR_CURRENT_PHASE;
BEGIN
   IF ISOLATED(MY_ADDRESS) THEN
         -- CURRENTLY, A NODE BELIEVES HE IS ISOLATED IF NONE OF HIS
         -- LINKS ARE ACTIVE.  IF THE ISOLATED PREDICATE EVALUATES
         -- FALSE, IT ALSO CLEARS THE ALREADY_SCANNING FLAG.
         IF ALREADY_SCANNING(MY_ADDRESS) THEN
               CONTINUE_SCANNING_FOR_UNREACHABLE_NODES(ASSIGNMENT);
                     -- AN ISOLATED NODE WILL CYCLE THROUGH ALL HIS KNOWN
                     -- NEIGHBORS WITH ALL HIS AVAILABLE LINKS, LOOKING FOR
                     -- A COOPERATING LINK TO ACQUIRE.
         ELSE
               INITIATE_SCAN_FOR_UNREACHABLE_NODES(ASSIGNMENT);
                     -- SET UP THE NECESSARY COUNTERS TO SEQUENCE THROUGH
                     -- THE SCAN PROCESS.  THIS PROCEDURE SETS THE
                     -- ALREADY_SCANNING FLAG.
         END IF;
         SCHEDULE_LINK_ASSIGNMENT(MY_ADDRESS);
         RETURN;
   END IF;

FOR PHASE IN PHASE_ENUM LOOP
      BEGIN
            DETERMINE_SET_OF_CANDIDATE_NODES(PHASE, C);
                  -- CANDIDATES ARE NODES WITH AVAILABLE LINKS OF THE TYPE
                  -- BEING ASSIGNED IN THE CURRENT PHASE

DETERMINE_SET_OF_CANDIDATE_LINKS(L);

EVALUATE_ASSIGNMENTS;
```

FIG. 4A

```
    EXCEPTION
        WHEN HIGH_PRIORITY_CONSTRAINTS_CANNOT_BE_MET =>
            USE_BEST_ASSIGNMENTS_SEEN_SO_FAR;
                -- WHEN HIGH PRIORITY CONSTRAINTS ARE NOT MET AND
                -- THE SEARCH_FOR_BEST_LINK_TO_BREAK FINDS NO
                -- LINKS WHOSE REASSIGNMENT WILL FACILITATE SUCH
                -- CONSTRAINTS, THE RESULT IS THE SET OF LINKS WHICH
                -- MOST NEARLY SATISFIES ALL CONSTRAINTS.
    END

STORE_BEST_ASSIGNMENTS_FOR_THIS_PHASE
        -- FURTHER PHASES MAY NOT REASSIGN TRANSCEIVERS ASSIGNED IN
        -- THIS PHASE.  THUS INHERENT PARALLELISM IS LIMITED TO
        -- PHASES WHICH INVOLVE INDEPENDENT LINK TYPES.  (E.G. ONCE
        -- THE EP_LINKS PHASE COMPLETES, THE CV_XLINKS AND
        -- BSTS_XLINKS PHASES COULD PROCEED CONCURRENTLY.
END LOOP
ASSIGNMENT := MY_LINKS(UNION_OF_BEST_ASSIGNMENTS_FROM_EACH_PHASE)
    -- THE RESULT IS THE UNION OF ALL ASSIGNMENTS SELECTED IN ALL
    -- PHASES INTERSECTED WITH THE SET OF FEASIBLE LINKS FOR THE
    -- CURRENTLY ACTIVE NODE.  EACH NODE COMPUTES THE NEW ASSIGNMENTS
    -- FOR THE ENTIRE NETWORK FROM A "GLOBAL"PERSPECTIVE, BUT MUST
    -- ONLY INITIATE THOSE WHICH INVOLVE HIM.
SCHEDULE_LINK_ASSIGNMENT(MY_ADDRESS);
    -- COMPUTATIONS OCCUR WITH SOME MINIMUM PERIOD (EVERY 60
    -- SECONDS), IF THEY ARE NOT TRIGGERED
    -- BY A FORCED TOPOLOGY UPDATE RECEIPT OR LOCAL LINK STATUS
    -- CHANGE.
END ASSIGN_LINKS
```

```
PROCEDURE DETERMINE_SET_OF_CANDIDATE_NODES(
        PHASE : LINK_CLASS;
        C     : OUT CANDIDATE_NODE_SET_FOR_CURRENT_PHASE) IS
BEGIN
    FOR EACH_NODE IN ADDRESS_TYPE LOOP
        IF EACH_NODE HAS_AVAILABLE_TRANSCEIVERS_ALLOCATED_TO PHASE THEN
            ADD_TO_SET(C, EACH_NODE);
            RECORD_AVAILABLE_TRANSCEIVERS;
                -- A LIST OF THE CORRESPONDING AVAILABLE TRANSCEIVERS
                -- ALLOCATED TO THIS PHASE AT EACH_NODE IS CREATED FOR
                -- USE IN THE EVALUATE_ASSIGNMENTS PROCEDURE.
        END IF;
    END LOOP;
END;
```

FIG. 5

```
PROCEDURE DETERMINE_SET_OF_CANDIDATE_LINKS(
        PHASE : LINK_CLASS;
        L     : OUT CANDIDATE_LINK_SET_FOR_CURRENT_PHASE) IS
BEGIN
    LOOP
        BEGIN
            DETERMINE_FEASIBLE_CANDIDATE_PAIRINGS;
                -- FEASIBLE PAIRINGS ARE PAIRS OF CANDIDATES WHICH MEET
                -- SIMPLE CONSTRAINTS SUCH AS LOS AND NUMBER OF
                -- AVAILABLE TRANSCEIVERS. THEY MUST ALSO QUALIFY FOR
                -- THE LINK_CLASS BEING ASSIGNED IN THIS PHASE.
            EXIT WHEN ALL_FEASIBLE_PAIRINGS_HAVE_BEEN_CONSIDERED
        EXCEPTION
            WHEN TOO_MANY_PAIRINGS_ARE_ACCUMULATED=>
                PRUNE_IDENTIFIED_PAIRINGS;
                    -- SORT THE IDENTIFIED PAIRINGS ACCORDING TO A
                    -- PARTIAL ORDER DEFINED BY THE GLOBAL
                    -- CONSTRAINTS. PRUNE UNNECESSARY AND
                    -- UNDESIRABLE LINKS FROM THIS ORDERED SET.
        END;
    END LOOP;

PRUNE_IDENTIFIED_PAIRINGS;
        -- SORT THE IDENTIFIED PAIRINGS ACCORDING TO A
        -- PARTIAL ORDER DEFINED BY THE GLOBAL
        -- CONSTRAINTS. PRUNE UNNECESSARY AND
        -- UNDESIRABLE LINKS FROM THIS ORDERED SET.

END DETERMINE_SET_OF_CANDIDATE_LINKS;
```

FIG. 6

```
PROCEDURE EVALUATE_ASSIGNMENTS(PHASE : LINK_CLASS) IS
BEGIN
    CASE PHASE IN
        WHEN EP_LINKS =>
            -- DIFFERENT FROM THE OTHER TWO PHASES BECAUSE THIS IS THE
            -- ONLY PHASE IN WHICH INTENTIONAL LINK BREAKAGE CAN HELP
            -- SATISFY THE HIGH PRIORITY CONSTRAINT.
            LOOP
                SEARCH_FOR_BEST_COMBINATION_OF_IDENTIFIED_PAIRINGS;
                    -- EACH COMBINATIONS OF PAIRINGS
                    -- REPRESENTING ONE POSSIBLE SOLUTION IS
                    -- CONSIDERED IN A "BEST FIRST" SEARCH AND
                    -- THE ONE BEST SATISFYING THE GLOBAL
                    -- CONSTRAINTS IS SAVED.
                EXIT WHEN HIGH_PRIORITY_CONSTRAINTS_ARE_MET;
                    -- IN BCD, WHEN CV ENTRY POINTS ARE FULLY
                    -- ASSIGNED
                SEARCH_FOR_BEST_LINK_TO_BREAK;
                    -- IF WE REACH THIS POINT, A CV ENTRY POINT
                    -- HAS NOT BEEN ASSIGNED TO EVERY BSTS AND
                    -- SSTS.  SEARCH FOR A FAVORABLE LINK TO
                    -- BREAK.
                ADD_AFFECTED_NODES_TO_CANDIDATE_SET;
                    -- IF AN EXISTING LINK IS IDENTIFIED WHOSE
                    -- REASSIGNMENT WILL ALLOW ESTABLISHMENT OF
                    -- ANOTHER CV ENTRY POINT, ADD THAT NODE TO
                    -- THE CANDIDATE LIST.
                ADD_NEW_CANDIDATE_PAIRINGS;
                    -- AUGMENT THE IDENTIFIED SET OF CANDIDATE
                    -- PAIRS AS THOUGH THE LINK DOES NOT EXIST
                PRUNE_IDENTIFIED_PAIRINGS;
                    -- SORT THE IDENTIFIED PAIRINGS ACCORDING TO A
                    -- PARTIAL ORDER DEFINED BY THE GLOBAL
                    -- CONSTRAINTS.  PRUNE UNNECESSARY AND
                    -- UNDESIRABLE LINKS FROM THIS ORDERED SET.

END LOOP
        WHEN BSTS_XLINKS | CV_XLINKS =>
            -- ILLUSTRATES THAT INTENTIONALLY BREAKING LINKS IS PROHIBITED
            -- IN LAST TWO ASSIGNMENT PHASES SINCE IT CANNOT HELP SATISFY
            -- THE HIGH PRIORITY CONSTRAINT CONCERNING EP_LINKS.  THE
            -- SEARCH IS PERFORMED ONLY ONCE IN EACH OF THESE PHASES.

SEARCH_FOR_BEST_COMBINATION_OF_IDENTIFIED_PAIRINGS;

END CASE
END EVALUATE_ASSIGNMENTS;
```

```
TYPE LINK_STATUS_TYPE   IS (
     INACTIVE,   -- TRANSCEIVER NOT FUNCTIONAL, CANNOT BE ASSIGNED.
     AVAILABLE,  -- TRANSCEIVER FUNCTIONAL, AVAILABLE TO BE ASSIGNED.
     PENDING,    -- TRANSCEIVER FUNCTIONAL, ASSIGNED, ATTEMPTING ACQUISITION.
     ACTIVE      -- FUNCTIONAL, ASSIGNED, LINK ACQUIRED, READY FOR COMM.
);

TYPE LINK_INFO_RECORD IS RECORD
     STATUS             : LINK_STATUS_TYPE := INACTIVE;
     NEIGHBOR_ADDRESS   : ADDRESS_TYPE := NULL_ADDRESS;
END RECORD;

TYPE LINK_INFO_ARRAY IS ARRAY(LINK RANGE 1..MAXIMUM_LINKS) OF
     LINK_INFO_RECORD;

TYPE NODE_STATUS_ENUMERATION IS (ACTIVE, INACTIVE);

TYPE TOPOLOGY_DATA_BASE_ENTRY IS RECORD
     NODE_STATUS              : NODE_STATUS_ENUMERATION;
     UPDATE_SEQUENCE_NUMBER   : UNSIGNED_INTEGER;
     UPDATE_TIME_OF_BIRTH     : FLOAT;
     LINK_INFO                : LINK_INFO_ARRAY;
END RECORD;

TYPE TOPOLOGY_DATA_BASE_ENTRY_PTR IS ACCESS TOPOLOGY_DATA_BASE_ENTRY;

TYPE TOPOLOGY_DATA_BASE IS ARRAY(ADDRESS_TYPE RANGE 1..MAX_NODES) OF
     TOPOLOGY_DATA_BASE_ENTRY_PTR;
```

FIG. 9 ial links are
METHOD OF ASSIGNING COMMUNICATION LINKS IN A DYNAMIC COMMUNICATION NETWORK This invention was made with United States Government Support under Contract No. F 30602-86-C-0224. The United States Government has certain rights in this invention.

BACKGROUND OF THE INVENTION

The present invention pertains to a technique for adaptively assigning communication links between communication nodes in a highly dynamic communication network such as a space-based network. The topology of such a network changes frequently due to various factors. By way of example, in a satellite network, satellite pairs are continuously going into and out of line-of-sight with each other, due to relative motion between the two satellites, particularly where the network is made up of two or more constellations of satellites at different orbital altitudes. As a consequence, many satellite pairs are continuously acquiring and losing the capability for direct communication between the two satellites of the pair. Furthermore, in hostile environments, threats from, for example, directed energy weapons, antisatellite weapons and jammers alter network topology. Satellites designed to survive such scenarios must carefully allocate their communication resources to maintain network performance. Each communication node in the network must have the ability to intelligently evaluate the existing network topology and mission-dependent criteria and to assign available resources such as transceivers, antennae, power, and bandwidth so as to maximize utilization and effectiveness Maintaining optimum communications further requires that the communication nodes be able to drop some links to establish more favorable ones and to take part in a coordinated search for neighbor nodes which are known to be isolated from the network.

To date, the bulk of satellite communication applications have revolved around space-to-ground links where human intervention is available to aid decision making and control. Entirely space-based networks require a high degree of reliability and the capability of autonomous operation.

SUMMARY OF THE INVENTION

The present invention is a process for dynamicly assigning communication links in a communication network in a way which exploits the inherent structure of the network topology. The process has been reduced to practice in a high fidelity distributed network simulation. Other proposed processes for dynamic link assignment produce irregular topologies and are generally incapable of managing a variety of transceiver types which are not compatible with one another. Most of these processes are untested in a distributed environment, particularly an environment like that of a space-based communication network. The present invention is more suited to the reliability and testability requirements of such networks. Simulation of the process has allowed evaluation of the process's performance in the context of a packet level discrete event simulation with distributed database management, where network management functions are decentralized among the various nodes, for example individual platforms in a satellite network.

The algorithm which forms a part of the present invention is organized into a set of phases in which different classes of links are assigned according to a set of mission oriented constraints. The phases are selected according to known mission requirements to decouple as much of the assignment process as is feasible and to give priority to certain classes of communication links. The assignment selection criteria are formulated as a set of constraints that are methodically applied to reduce the number of possible assignments under consideration. When this reduction process is complete, a unique solution may still not be apparent, but finding the solution is reduced to a manageable task. At this point a guided search is applied to arrive at the best solution. All nodes in the network exchange link status information and compute the algorithm in response to certain stimuli. Thus, all nodes come to a consistent decision in an implicitly coordinated manner.

A communication network may have more than one type of transceivers, for example RF transceivers and laser transceivers resulting in different types or classes of links. Further, some classes of links may have a higher priority than other classes, for example links between nodes in separate sub-networks may have priority over links between nodes within the same sub-network. Each class of links is assigned in a separate phase in a prioritized order. By way of example, a typical satellite network may have three constellations or sub-networks of satellites which have three different altitudes, such as an outer layer of high earth orbiting satellites, an inner layer of low earth orbiting satellites, and a middle layer of intermediate altitude earth orbiting satellites, with the outer layer in a geosynchronous orbit. In this example, the assignment phases of the algorithm may be:

1. Assignment of links between constellations.
2. Assignment of links within one or more of the constellations.

Phase 2, during which intraconstellation links are assigned, can be undertaken as many times as there are constellations. However, one or more of the constellations may be without intraconstellation links.

Communication requirements often dictate that links between constellations are of higher value than links within a constellation. Assignment of these two types of links are highly interdependent, since assignment of a transceiver to an intraconstellation communication link precludes its use in an inter-constellation link. The algorithm of the present invention can deal with this requirement by allocating the first phase to assignment of inter-constellation links. If necessary, intraconstellation links will be disconnected to establish the best possible set of inter-constellation links.

Later phases of the algorithm are devoted to assignment of intraconstellation links Since there would be no conflicts between constellations, all intraconstellation link assignment phases can be undertaken simultaneously. Separating the algorithm into such phases has the advantage of considering decoupled segments of the problem separately, reducing computational complexity via a divide-and-conquer technique. Execution of the algorithm control structure is repeated for each phase.

A set of constraints is formulated and applied in a prioritized manner to limit the number of acceptable assignment sets to a manageable size. The following set of constraints, formulated for a large communication network architecture, has been employed with good results:

1. The limited number of transceivers reserved for links in high priority classes must be fully utilized.
2. The total number of assigned links in the network must be maximized.
3. The expected duration of the resulting network topology must be maximized.
4. The total length of all links in the network must be kept to a minimum.

These constraints are listed in order of importance. High priority can be given to some of the constraints in the various phases by requiring that those constraints must be met by any assignment selected in that phase, if possible, and allowing existing links to be broken to establish new links which meet these criteria. As an example, in a three constellation satellite network, if utilization of all transceivers reserved for interconstellation links is the only high priority constraint, this implies that should any transceiver reserved for interconstellation links (phase 1) remain unassigned at the end of the corresponding assignment phase, a link will be broken at the best potential candidate, selected according to the above criteria, and phase 1 of the algorithm will then be recomputed, considering the nodes so liberated.

BRIEF DESCRIPTION OF THE DRAWINGS

These and other aspects and advantages of the present invention are more apparent from the following detailed description and claims, particularly when considered with the accompanying drawings. In the drawings:

FIGS. 5-7 present a top level Ada pseudo code description of procedures within FIG. 4.

DETAILED DESCRIPTION OF A PREFERRED EMBODIMENT

Figure 1:
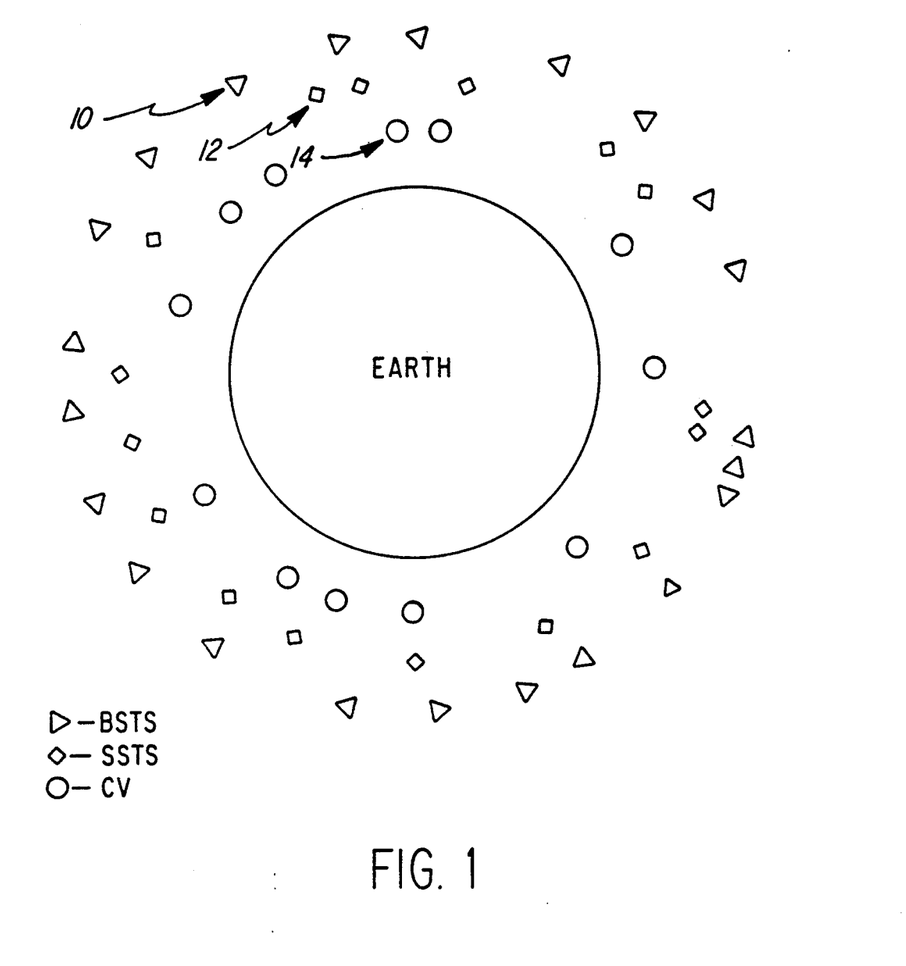
FIG. 1 is a schematic representation of a communication network incorporating the present invention.
Figure 2:
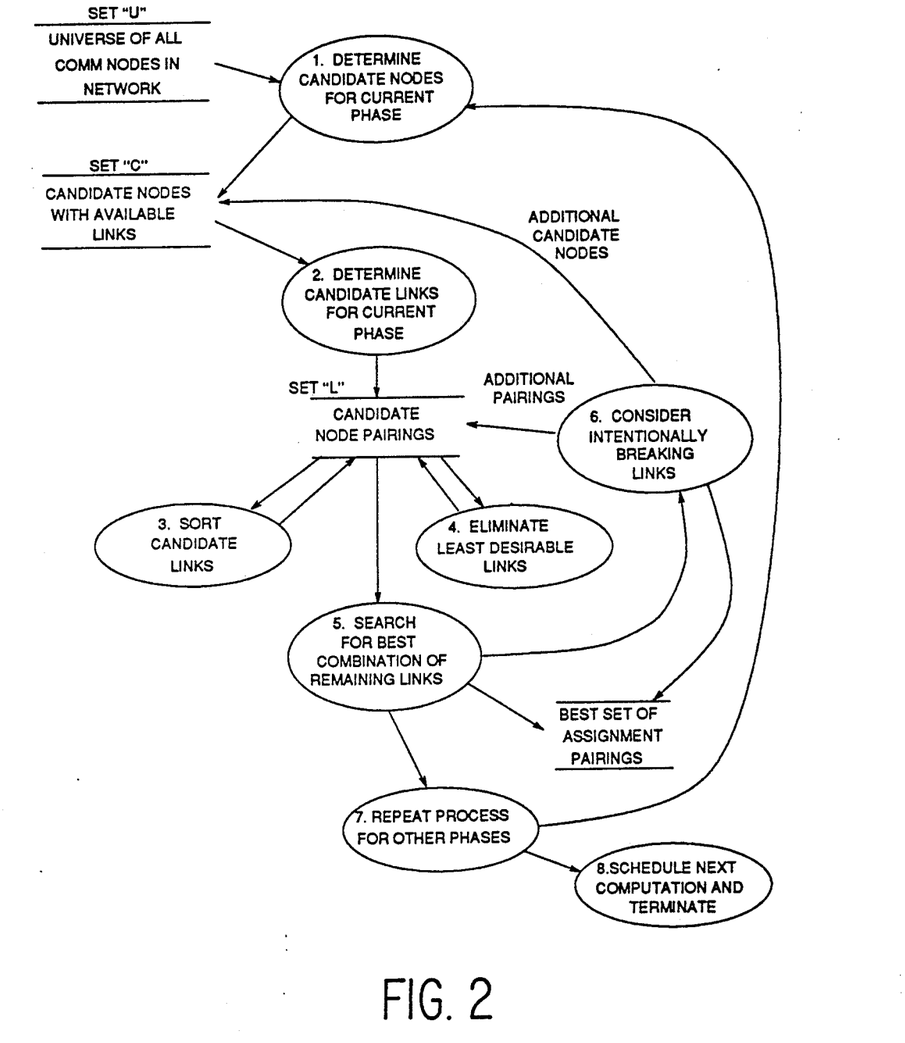
FIG. 2 presents a data flow diagram of the algorithm for use in a communication network in accordance with the present invention.

The present invention will be described with reference to a baseline concept description (BCD) of a representative communication network having three constellations of earth orbiting satellites, as illustrated in FIG. 1, including an outer constellation 10 of boost surveillance and tracking satellites (BSTS), an intermediate constellation 12 of space surveillance and tracking satellites (SSTS), and an inner layer 14 of carrier vehicles (CV). FIG. 2 presents a data flow diagram of the algorithm utilized in such a communication network in accordance with the present invention. The interface with the algorithm is described in the Ada package specification set forth in FIG. 3.

Figure 3:
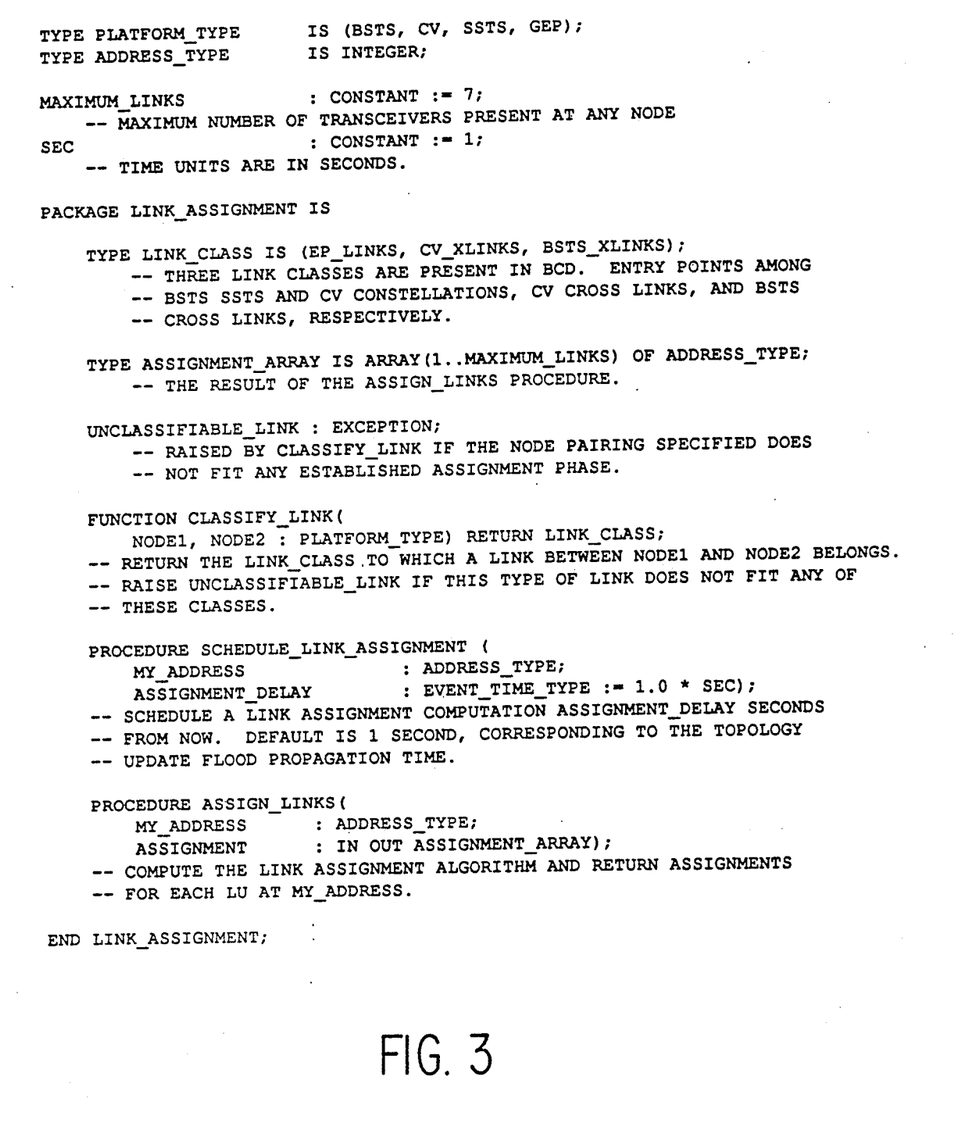
FIG. 3 is an Ada package specification for the algorithm of FIG. 2.

With reference to FIG. 3, the Link—Class type enumerates the different assignment phases which are carried out by the algorithm. The Classify—Link function is used to categorize prospective links into the appropriate one of the assignment phases and is accessible by other network management entities. The Schedule—Link—Assignment procedure sets a timer which triggers the next link assignment computation. This computation occurs at least once per minute, but no more frequently than once per second. Finally, the Assign—Links procedure actually computes the algorithm and returns the Assignments for the node designated by the parameter —My Address."

The result of Assign—Links is given in the Assignment array, which contains one entry per transceiver at node My-Address. Each entry is either the address of the node to which the corresponding transceiver is assigned, or "Null" if that transceiver is to remain unassigned. This information is compared with the current link status at node My—Address to determine the required actions If a currently active transceiver receives a null assignment, its link is broken and it is not reassigned. If it receives a non-null assignment, different from its current assignment, it drops its current link and begins acquisition of its newly assigned link. If its new assignment is identical to its present assignment, no change is invoked.

Figure 4A:
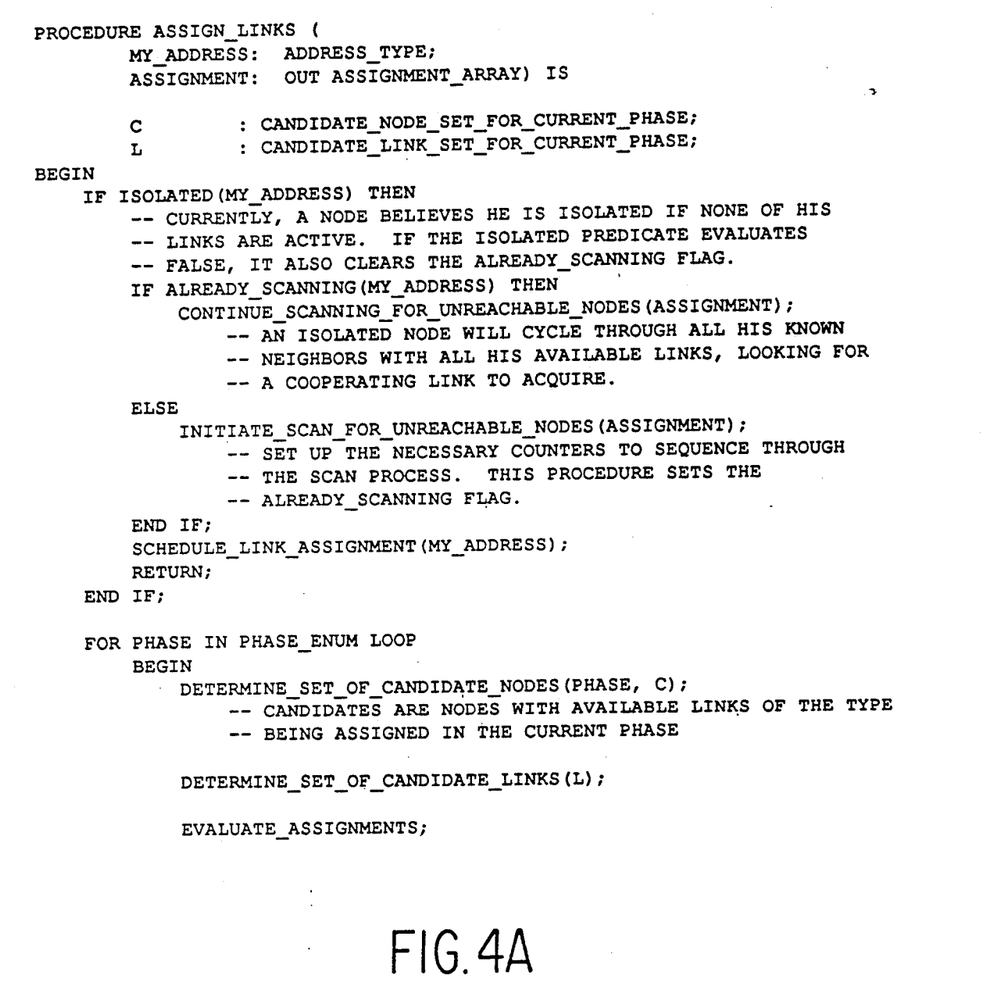
FIGS. 4A and 4B, when positioned as depicted in FIG. 4C, comprise FIG. 4 which presents a top level Ada pseudo code description of the algorithm of FIG. 2.
Figure 4B:
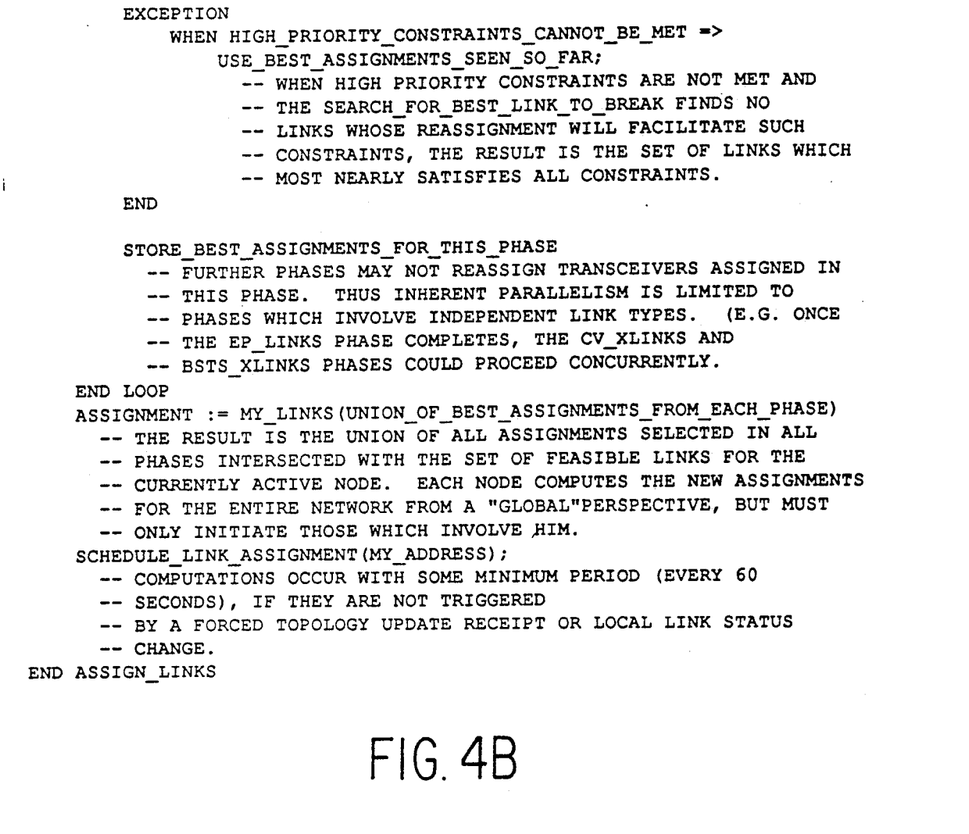
Figure 4C:
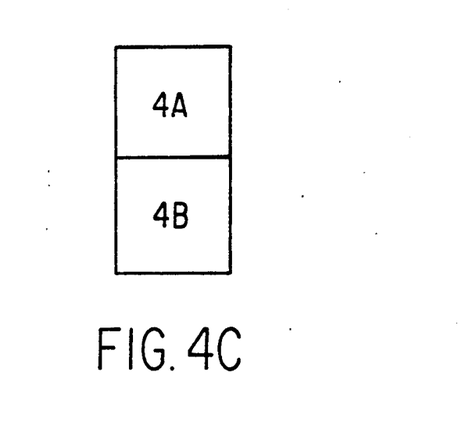
Figure 5:
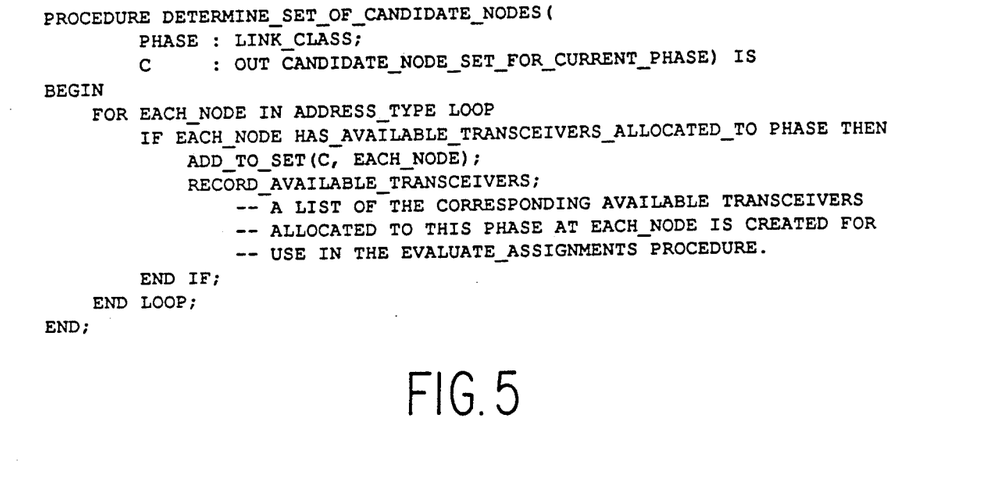
Figure 6:
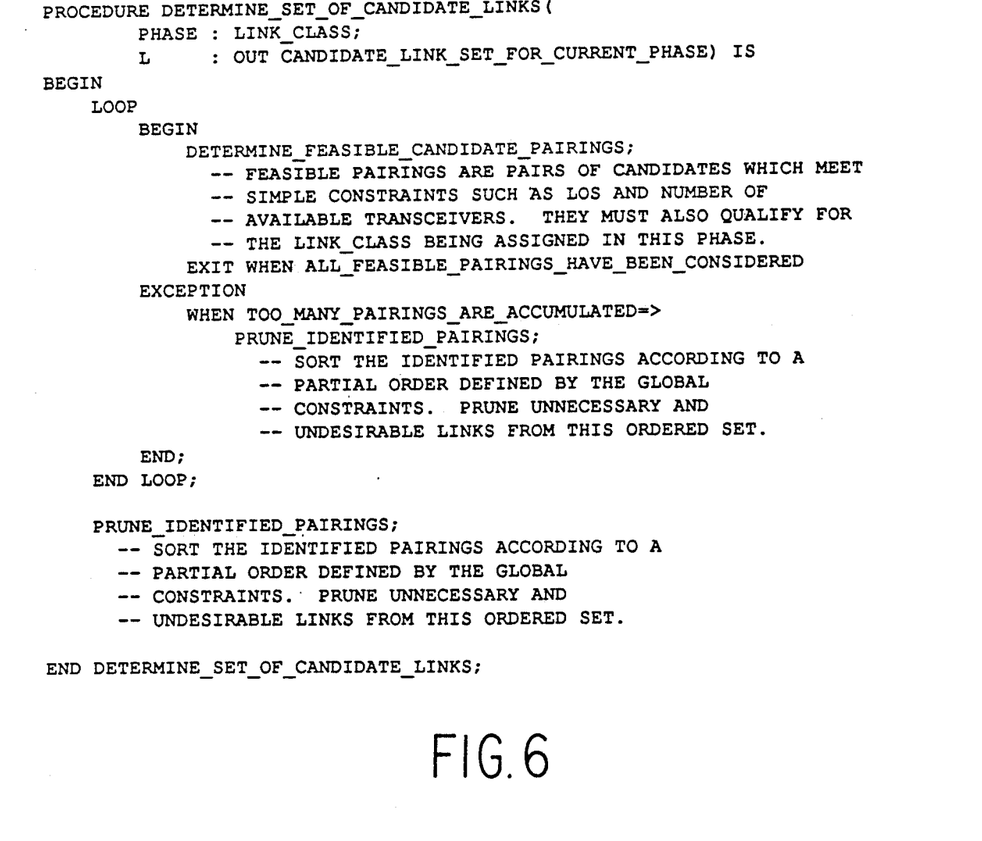

A top level description of the key subprograms of the algorithm, including the Assign Links procedure, is given in FIGS. 4 through 7 for a three constellation network. FIGS. 5, 6, and 7 set forth in Ada psuedo code the Determine—Set—of—Candidate—Nodes procedure, the Determine—Set—of—Candidate—Links procedure, and the Evaluate—Assignments procedure, respectively from the Assign—Links procedure of FIG. 4.

When invoked at a node, the Assign Links procedure of FIG. 4 first checks to see whether a currently active node is isolated from the rest of the network. If this is the case, all available links at the isolated node are sent into a coordinated search for cooperating neighbors. With sufficiently many nodes active, the global constraint set assigns some nodes which are still a part of the network to attempt acquisition with the lost node. When the lost node finds its neighbors, acquisition proceeds normally.

Certain enhancements can be incorporated into this scheme. The search for unreachable neighbors could be triggered by a diminished sub-constellation or island size, rather than by complete isolation of an individual node. This could avoid undesirable modes where more than one stable island has formed. Also, when a node becomes unreachable, the distributed topology database still contains useful information which could guide the recovery process. This information becomes stale with time, but it could be used for a limited period to guide the search for neighbors.

Each assignment phase begins by enumerating the set C of candidate nodes for that phase, as set forth in FIG. 5. For each phase, C is defined as the set of nodes with at least one transceiver which is both unassigned and compatible with the class of links which will be assigned in this phase. For instance, if a particular phase is reserved for assignment of links between constellations, a node which has available only a transceiver reserved solely for intraconstellation links would not be a candidate node and so would not be a member of set C, but a node with a free transceiver usable for an interconstellation link would be a member. In addition, the number of compatible, available transceivers is noted for each member of set C.

After formation of set C of candidate nodes, the set L is formed containing all possible pairings of the members of set C, as set forth in FIG. 6. The algorithm uses several restrictions to limit the size of this set from becoming too large. First, only node pairs which are currently in sight of one another need to be included in the set, because only these pairs could establish a direct communication link. Second, only node pairs with compatible transceivers need to be considered, since, for example, a laser transceiver at one node cannot form a link with an RF transceiver at another node. Further, it is not necessary to include more pairs involving a particular node than the number of available transceivers at that node. To capitalize on this, a subset of the topology constraints must be formed which can be evaluated by examining the contribution of individual links. This subset is transformed into an evaluation function which is used to sort the possible members of L in order of preference. Then, for any node with N available links, only the best N pairings are required.

Often more than enough pairings must be retained for some nodes in order to include sufficiently many pairs for some others. As a result, not all assignment pairs in L are consistent. For example, if a node A does not have at least two transceivers available, selection of a link from node A to node B prevents establishment of a link from node A to node C.

To determine a final, consistent solution, a graph search procedure is used to select the best subset of the identified assignment pairings. This search over the remaining feasible assignment pairings is conducted by applying constraints 1-4 listed above to each subset in a prioritized manner. Any topology which meets constraint 1 is preferred over one which does not. Any topology which meets constraints 1 and 2 is preferred over one which meets 1 but not 2, etc.

The algorithm applies these constraints globally to all members of the candidate subset, which satisfy the constraints as to the entire topology as well as to the individual links. The search progresses in a "best first" manner, as much as possible, beginning with those combinations which include the maximum feasible number of assignment pairings, i.e., half the number of available transceivers. The best solution among these combinations, if an acceptable solution is found, is known to be the best overall solution, since the above constraints require that as many transceivers as possible be assigned. Therefore, if an acceptable solution is found after searching these combinations, the search terminates. Otherwise, the search continues through other combinations which include fewer and fewer assignments.

If the best solution at this point does not meet the minimum set of high priority constraints, an existing link is selected whose termination would liberate transceivers capable of meeting the mandatory constraints through reassignment. If these high priority constraints cannot be met, even by breaking and reassigning existing links, the current assignment phase terminates, returning the best known assignment set. If a link is selected for breakage, the current assignment phase is repeated assuming that the transceivers from that link ar available. After one or more such iterations, the minimum set of constraints is usually met, and the current algorithm phase is completed.

The result is a unique solution that is best in terms of the prioritized list of constraints assigned to the problem and that is guaranteed to meet designated high priority constraints, if such a solution exists. When no solution exists which meets all the required constraints, the algorithm selects the best solution, meeting as many of the prioritized constraints as possible.

Figure 8:
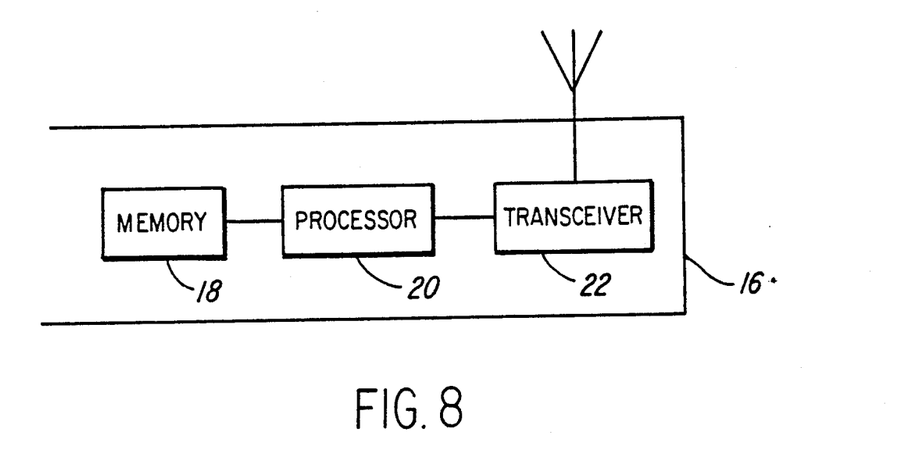
FIG. 8 is a block diagram representation of a communication node.
Figure 9:
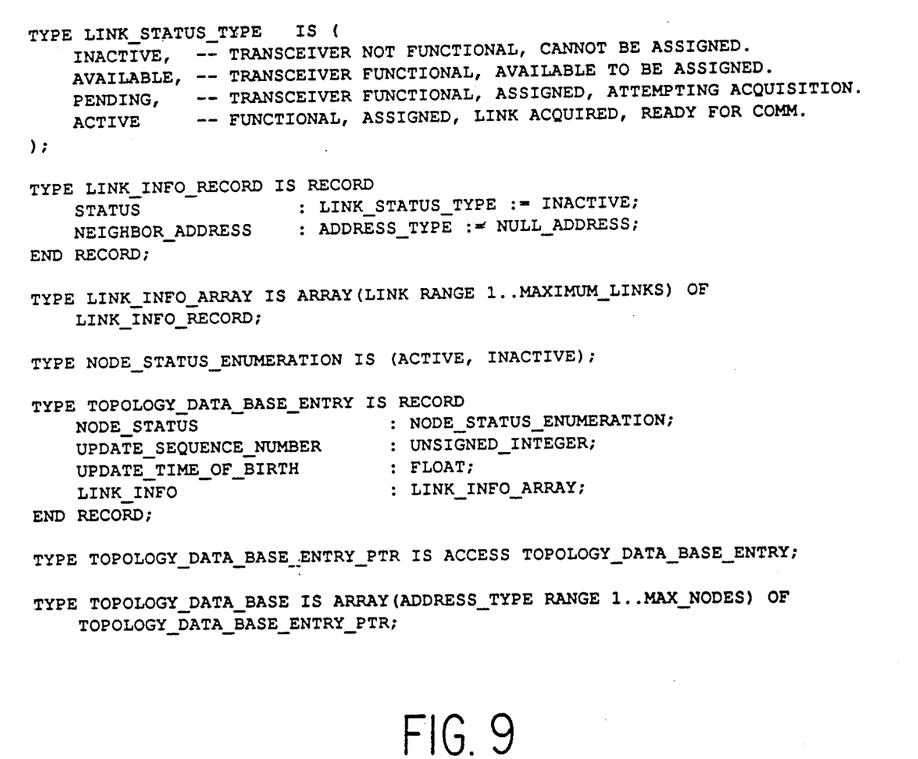
FIG. 9 presents the topology database entry for each node in accordance with the present invention, as defined in this Ada pseudo code.

To compute the algorithm, each node 16 must maintain a local copy of a network topology database in its memory 18 for computing in its processor 20, as shown in FIG. 8. This can be similar to that of the New Arpanet routing algorithm. This database has one entry per node in the network and contains link status and endpoint address for each transceiver at each node The topology database entry for each node, as defined in Ada pseudo code, is presented in FIG. 9.

The local copy of this database at each node is updated via the New Arpanet topology update flood technique. When a transceiver 22 (FIG. 8) enters or leaves the active state, the corresponding node 16 reports this fact to all other nodes by generating a forced topology update. The term "forced" is used to distinguish it from normal topology updates generated by the adaptive routing algorithm. The forced topology update consists of a message containing the node's address, the current time of day, a sequence number (incremented for each new topology update) and the node's LINK—INFO—ARRAY. The node transmits this message over all its active links. Nodes receiving a topology update compare the sequence number and time of day in the message to that of the last received topology update from the sending node as stored in the memory 18 at each receiving node 16. If the topology update has already been received, it is discarded. If not, it is copied into the topology database and forwarded along all active links except the one on which it was received In this way, all nodes in the network learn of link failure and acquisition very quickly.

The algorithm is computed by each node when it loses an active link or receives a forced topology update, but with some minimum frequency, such as at least once per minute for low earth orbiting satellites. However, since link failures generally occur in pairs, i.e. at the two nodes at the ends of a link, it is inefficient to compute the algorithm immediately after receipt of a forced topology update. Instead, the computation is delayed by one flood propagation interval, i.e. the time required for a topology update flood to traverse the network under worst case conditions, from the time the forced topology update is received. If any other forced topology update is received during this time, it is included in the upcoming computation to insure that all topology updates relating to a single incident are reflected in the computation. Flood propagation time is typically less than one second.

Several mechanisms are available for estimating the time that a pair of nodes in the satellite network will remain in line of sight of each other. The most accurate of these is direct computation from orbital dynamics equations, assuming a spherical earth for simplicity.

In certain constellations, a few satellite pairs may remain in line of sight of one another constantly due to low relative velocities. More typically, a given pair of satellites has some maximum time period $T_{max}$ over which the satellites can ever remain in line of sight due to their relative motion. For satellite pairs with a common finite $T_{max}$, the pair of satellites with maximum expected time in line of sight at time t is the pair that is nearest together at time $$t + \frac{T_{max}}{2}.$$

For example, for links from low earth orbiters to geosynchronous satellites, $T_{max}$ is approximately 45 minutes. Therefore, for a given geosynchronous orbiter, the low earth orbiter which will be in line of sight the longest at time t is the one that is nearest to that geosynchronous satellite at time t+22.5 minutes. Thus, a link assignment scheme requiring maximum expected longevity of the prevailing topology need only compute link distances at some future instant of time, rather than iterating through direct line-of-sight calculations over a time interval. There are some degeneracies in this approximation, for example when the low earth orbiter's orbital plane is perpendicular to a line segment connecting the geostationary satellite with the center of the earth. Nevertheless, this approximation can be very useful.

For any pair of satellites within a constellation, and thus having the same altitude, eccentricity, and inclination, the average time in line of sight over one orbit is a constant. It is a simple matter to construct a table of these values at each satellite, however the values are only averages and at any instant in time, the remaining time in line of sight may differ greatly from these average values. A selected link with a high estimated time in line of sight using this approximation may lose line of sight immediately after it is assigned, or it may continue for twice the estimated average time. Nevertheless, on the whole, this technique results in acceptable choices, reducing computational complexity at the expense of a few poor decisions.

Constraints 1-4 listed above do not include any restriction on the number of disjoint paths between node pairs. This is a deliberate reduction in complexity which may result in poor decisions in the presence of massive node failures. However, it has provided good results in response to small perturbations, on the order of several node failures per minute.

Although the present invention has been described with reference to preferred embodiments, rearrangements and alterations can be made, and still the result will be within the scope of the invention.

What is claimed is:

1. In a communication network including a plurality of communication nodes, each node having at least one communication transceiver adapted to form a communication link with a compatible communication transceiver at another of said nodes, a method of assigning communication links between transceivers at the nodes, said method comprising at each node the steps of:
   (a) storing a set of link assignment constraints;
   (b) designating a subset of the constraints as high priority constraints;
   (c) determining a set C of candidate nodes having an unassigned transceiver with which an unassigned transceiver at said each node is compatible to form a communication link;
   (d) determining a set L of possible links that satisfy the high priority subset of constraints and that can be formed by said unassigned transceiver at said each node and the unassigned transceivers at the candidate nodes in set C;
   (e) evaluating the possible links in set L to determine a set of link assignments in set L satisfying the greatest number of the stored set of constraints; and
   (f) assigning the links in accordance with the set of link assignments determined in step (e).

2. A method as claimed in claim 1, wherein the communication links include links within a plurality of communication link classes having different communication characteristics, said method further comprising performing steps (c) through (f) once for each class.

3. A method as claimed in claim 2, further comprising assigning selected transceivers for communication links of a selected one of the classes, assigning the selected class of links priority over links of other classes, and designating as one of the high priority constraints the assigning of all of the selected transceivers to links of the selected class, whereby if a selected transceiver is unassigned following the performing of step (d) for its class of links, a link of another class is broken, the transceivers from the broken link are added to set C, and steps (c) and (d) are repeated for that class of links.

4. A method as claimed in claim 1, wherein the communication nodes are earth orbiting communication satellites.

5. A method as claimed in claim 4, wherein step (d) includes determining whether the pairs of nodes forming each possible link are in line of sight with each other.

6. A method as claimed in claim 5, wherein step (d) further includes determining whether the transceivers forming each possible link are compatible to form a communication link.

7. A method as claimed in claim 4, wherein step (d) includes determining whether the transceivers forming each possible link are compatible to form a communication link.

8. A method as claimed in claim 4, wherein step (e) includes determining the set of links formed by the set of satellite pairs having the maximum expected time in line of sight.

9. A method as claimed in claim 8, wherein the set of satellite pairs having the maximum expected time in line of sight is determined by direct computation, assuming a spherical earth.

10. A method as claimed in claim 8, wherein the set of satellite pairs having the maximum expected time in line of sight is determined at time t for those satellite pairs having a common finite $T_{max}$ by determining the pairs of satellites that are closest together at time $$t + \frac{T_{max}}{2},$$

where for each satellite pair $T_{max}$ is the maximum time over which the pair can remain in line of sight with each other.

11. A method as claimed in claim 1, wherein step (d) includes determining whether the transceivers forming each possible link are compatible to form a communication link.

12. A method as claimed in claim 1, wherein step (e) includes determining whether the set L includes a number of links sufficient for desired communication in the network, and if not, determining at least one existing link to be broken to provide additional unassigned transceivers and repeating steps (c) through (e).

13. A method as claimed in claim 1, further comprising:
- at each node at which a change of a link from the node occurs, broadcasting, to all the communication nodes with which said each node is forming a communication link, an update of the network topology as a result of the change, and repeating steps (c) through (f); and
- at each node at which a broadcast of an update of the network topology is received, repeating steps (c) through (f).

14. A method as claimed in claim 13, wherein following the broadcast of a first update of the network topology, each node waits a first preset time interval before repeating steps (c) through (f) to permit broadcasting of additional updates of the network topology.

15. A method as claimed in claim 14, further comprising repeating steps (c) through (f) at second preset time intervals.

16. A method as claimed in claim 14, wherein the first preset time interval is of a duration sufficient to permit receiving of any additional broadcasts of updates of the network topology resulting from the same topology change that resulted in the broadcast of the first update.

17. A method as claimed in claim 1, further comprising repeating steps (c) through (f) at preset time intervals.

18. In a communication network including a plurality of communication nodes, each node having at least one communication transceiver adapted to form a communication link with a compatible communication transceiver at another of said nodes, an apparatus for assigning communication links between transceivers at the nodes, said apparatus comprising at each node:
- means for storing a set of link assignment constraints;
- means for designating a subset of the constraints as high priority constraints;
- first determining means for determining a set C of candidate nodes having an unassigned transceiver with which an unassigned transceiver at said each node is compatible to form a communication link;
- second determining means for determining a set L of possible links that satisfy the high priority subset of constraints and that can be formed by said unassigned transceiver at said each node and the unassigned transceivers at the candidate nodes in set C;
- evaluating means for evaluating the possible links in set L to determine a set of link assignments in set L satisfying the greatest number of the set of constraints stored in said storing means; and
- assigning means for assigning the links in accordance with the set of link assignments determined by said evaluating means.

19. Apparatus as claimed in claim 18, wherein said transceivers include transceivers capable of forming communication links of a plurality of communication link classes having different communication characteristics, said apparatus further comprising means for storing the assignments of selected transceivers for communication links of a selected one of the classes; means for storing the assignment of links to the selected class, the assigned links having priority over links of other classes; means for designating as one of the high priority constraints the assigning of all of the selected transceivers to links of the selected class; and means responsive to a selected transceiver remaining unassigned following the determining of the set L for breaking a link of another class to permit the transceivers from that link to be utilized with the unassigned selected transceivers to form a link of the selected class.

20. Apparatus as claimed in claim 18, wherein the communication nodes are earth orbiting communication satellites.

21. Apparatus as claimed in claim 20, wherein the second determining means includes means for determining whether the pairs of noes forming each possible link are in line of sight with each other.

22. Apparatus as claimed in claim 21, wherein the second determining means further includes means for determining whether the transceivers forming each possible link are compatible to form a communication link.

23. Apparatus as claimed in claim 20, wherein the second determining means includes means for determining whether the transceivers forming each possible link are compatible to form a communication link.

24. Apparatus as claimed in claim 20, wherein the evaluating means includes means for determining the set of links formed by the set of satellite pairs having the maximum expected time in line of sight.

25. Apparatus as claimed in claim 24, wherein the means for determining the set of satellite pairs having the maximum time in line of sight comprises means for directly computing the expected times in line of sight for the links of set L, assuming a spherical earth.

26. Apparatus as claimed in claim 24, wherein the means for determining the set of satellite pairs having the maximum expected time in line of sight comprises means for determining $T_{max}$ for the links of set L, and means for determining at time t the pairs of satellites that are closest together at time $$t + \frac{T_{max}}{2}$$

for those satellite pairs having a common finite $T_{max}$, where for each satellite pair $T_{max}$ is the maximum time over which the pair can remain in line of sight with each other.

27. Apparatus as claimed in claim 18, wherein the second determining means includes means for determining whether the transceivers forming each possible link are compatible to form a communication link.

28. Apparatus as claimed in claim 18, wherein the evaluating means includes means for determining whether the set L includes a number of links sufficient for desired communication in the network, and means responsive to a determination that the set L does not include a sufficient number of links for determining existing links to be broken to provide additional unassigned transceivers.

29. Apparatus as claimed in claim 18, further comprising:
- means responsive to a change of a link from the node for broadcasting, to all the communication nodes with which said each node is forming a communication link, an update of the network topology as a result of the change; and
- means responsive to receipt of a broadcast of an update of the network topology for activating said first determining means, said second determining means, said evaluating means, and said assigning means to provide an updated set of link assignments.

30. Apparatus as claimed in claim 29, wherein said responsive means includes a first timer for timing a preset time interval before activating, to permit broadcasting of additional updates of the network topology.

31. Apparatus as claimed in claim 30, further comprising a second timer for timing a second preset time interval; and means responsive to completion of timing of the second time interval for activating said first determining means, said second determining means, said evaluating means, and said assigning means to provide a new set of link assignments.

32. Apparatus as claimed in claim 30, wherein the first preset time interval is of a duration sufficient to permit receiving of any additional broadcasts of updates of the network topology resulting from the same topology change that resulting in activation of the first timer.

33. Apparatus as claimed in claim 29, further comprising a timer for timing a preset time interval; and means responsive to completion of timing of the time interval for activating said first determining means, said second determining means, said evaluating means, and said assigning means to provide a new set of link assignments.

* * * * *